Feb. 20, 1968 E. A. KAMP Re. 26,346

VIBRATING SPRING STRUCTURE

Original Filed April 28, 1958 2 Sheets-Sheet 1

INVENTOR.
Ewald A. Kamp
BY:
Olson & Trexler
Attys.

VIBRATING SPRING STRUCTURE

Original Filed April 28, 1958 2 Sheets-Sheet 2

INVENTOR.
Elwald A. Kamp
BY:
C. Olson & Trexler
Attys.

United States Patent Office

Re. 26,346
Reissued Feb. 20, 1968

26,346
VIBRATING SPRING STRUCTURE

Ewald A. Kamp, Chicago, Ill., assignor, by mesne assignments, to ACD Bedding Corporation, New York, N.Y., a corporation of New York Original No. 3,048,168, dated Aug. 7, 1962, Ser. No. 731,518, Apr. 28, 1958. Application for reissue May 13, 1963, Ser. No. 280,173
8 Claims. (Cl. 128—33)

Matter enclosed in heavy brackets [ ] appears in the original patent but forms no part of this reissue specification; matter printed in italics indicates the additions made by reissue.

This invention relates to coil spring structures and more particularly to an improved vibratable coil spring structure.

It has been generally recognized that a person reclining on a surface is soothed by the vibration thereof when the vibrations are high frequency and low amplitude vibrations. Numerous structures have been devised for the purpose of supporting a person and vibrating him at a high frequency and a low amplitude. In most instances, the construction of these structures includes a vibrator mounted on a supporting frame of the structure, so that vibrations are usually transmitted to a supporting floor, thereby creating an undue amount of noise. Another disadvantage appurtenant to the mentioned arrangement is that the vibration tends to shake apart the supporting frame. Furthermore, the vibrations are usually transmitted from the supporting frame to springs which support a person so that a portion of the vibratory energy is absorbed by the springs and little is transmitted to the person, thereby diminishing the efficiency of the vibrator.

One of the objects of the herein disclosed invention is to provide a vibratable spring structure wherein vibrating energy is transmitted to a person reclining on the spring structure without any substantial loss in the springs of the spring structure.

Another object of the herein disclosed invention is to provide a spring structure wherein a vibrator does not transmit substantial vibrating energy to a supporting frame.

A further object of the herein disclosed invention is to provide a spring structure which may be used with ordinary bedsteads.

Other objects and uses of the herein disclosed invention will become apparent to those skilled in the art upon a reading of the specification in light of the accompanying drawings.

In the drawings:

FIG. 1 is a perspective view of a bed showing a box spring with a portion broken away, said box spring includes a spring structure embodying the herein disclosed invention;

FIG. 2 is a fragmentary plan view of the spring structure in the box spring shown in FIG. 1;

Figure 3:
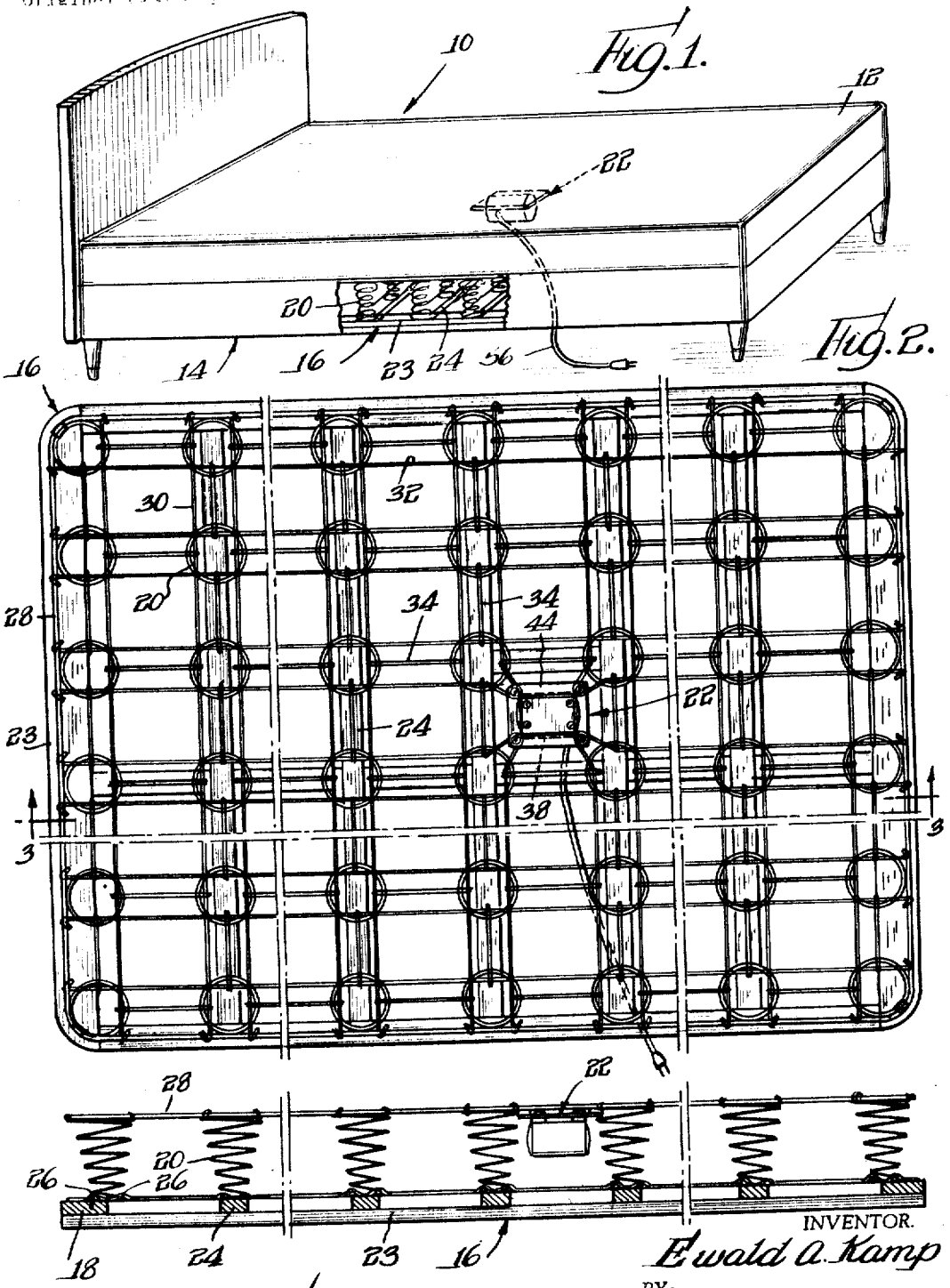
FIG. 3 is a fragmentary cross sectional view taken on line 3—3 of FIG. 2.

Referring now to the drawings, FIG. 1 shows a bed, generally indicated by numeral 10. The bed 10 generally includes a conventional mattress 12 and a box spring 14 supporting the mattress. The box spring includes a spring structure 16 which spring structure embodies the herein disclosed invention.

As may be seen in FIGS. 2 and 3, the spring structure 16 includes a spring frame 18, which has a plurality of coil springs or coils 20 mounted thereon. Each of said coils is attached at one end to the frame and each of the coils has its longitudinal axis perpendicular to the plane of the frame, so that all of the coils are parallel to each other. The coils are spaced an equal distance from adjacent coils to provide a spring structure which has a uniform resilience. A vibrator, generally indicated by numeral 22, is attached to the spring structure 16 as will be described below.

The spring frame includes a substantially rectangular frame structure 23 and a plurality of spring supports 24 which supports are mounted within the frame structure. Each of the spring supports has its ends mounted on respective opposite longitudinal edges of the frame structure. Each spring support is positioned substantially parallel to each other spring support and parallel to the lateral ends of the spring frame structure. The aforementioned coil springs or spring units are fixed to the spring supports by means of spring strips 26. Each strip 26 fixes one end of each coil of a plurality of coils to its respective spring support.

Each coil 20 has one end fixed to the spring frame as described above. The free ends of the coils are interconnected by a connecting means described below. The outer edge of each of the coils along the periphery of the spring structure is attached to a border wire 28, which border wire provides an edge of increased resiliency for the spring structure. A plurality of parallel lateral connecting wires 30 are fixed to opposite longitudinal edges of the border wire 28. A pair of lateral connecting wires 30 overlies each of the coils except the coils adjacent the lateral edegs of the border wire as may be seen in FIG. 2. A plurality of parallel longitudinal connecting wires 32 are fixed to the lateral edges of the obrder wire 28. Said plurality of parallel longitudinal connecting wires cooperate with the lateral connecting wires to interconnect the coil springs. A pair of longitudinal connecting wires 32, which wires 32 are perpendicular to the lateral wires 30, overlies each of the coils except the coils adjacent the longitudinal edges of the border wire. Thus, the lateral and longitudinal connecting wires overlie the tops of coils 20 and retain the coils between the connecting wires and their respective coil supports.

Figure 4:
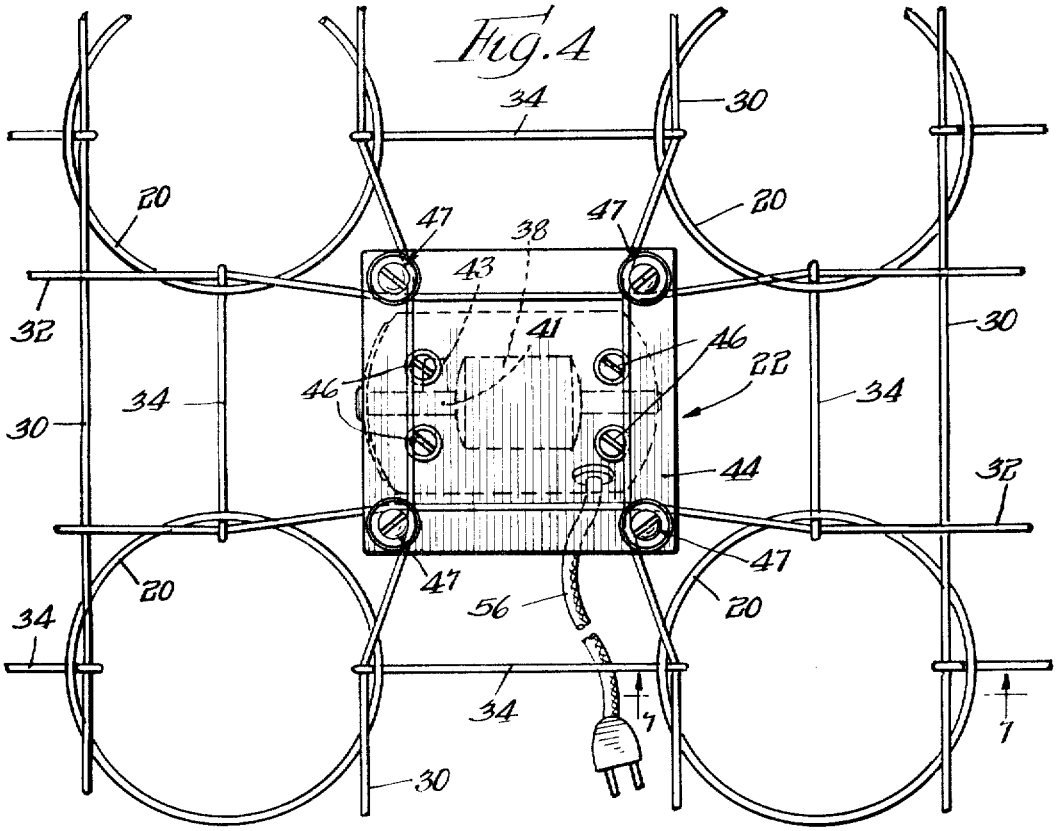
FIG. 4 is an enlarged plan view of a portion of the spring structure shown in FIG. 2 showing a vibrator attached to spring units.
Figure 7:
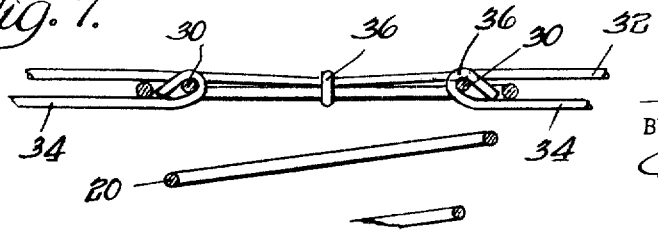
FIG. 7 is a cross sectional view taken on line 7—7 of FIG. 4.

Referring now to FIGS. 2, 4 and 7, it may be seen that a plurality of coil links 34 lock the upper portion of each of the coils to the respective adjacent connecting wires. Looking now particularly to FIG. 7, link 34 is positioned under the uppermost coil of an associated coil spring 20, and a locking portion 36, which constitutes one end of link 34, is looped over one of the lateral connecting wires associated with said coil spring to lock together the coil, the lateral connecting wire and the link. The opposite end of the link 34, which is not shown, is locked in the same manner to a connecting wire associated with an adjacent coil spring. Thus, the links 34 connect adjacent coil springs and attach the connecting wires to the associated coil springs. The links 34 also connect the longitudinal connecting wires to adjacent coils in the same manner that the links connect the lateral connecting wires to adjacent coils as described above. Thus, the links and the connecting wires provide a coil connecting means, which interconnects the coils into a spring assembly.

The aforementioned vibrator includes an electric motor 38 shown in phantom view in FIG. 4. The electric motor has a motor shaft 41, which shaft is aligned parallel to the longitudinal connecting wires. An unbalanced weight 43 is attached to motor shaft 41, thereby making the motor unbalanced so that it vibrates when the shaft rotates. The motor is mounted in a housing 42, which housing is attached to a vibrator plate 44 by means of a plurality of screws 46.

Figure 5:
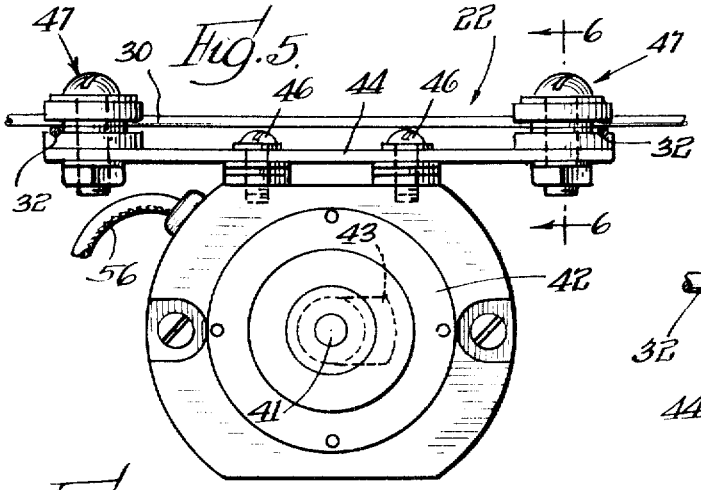
FIG. 5 is an end elevation of the vibrator shown in FIG. 4.
Figure 6:
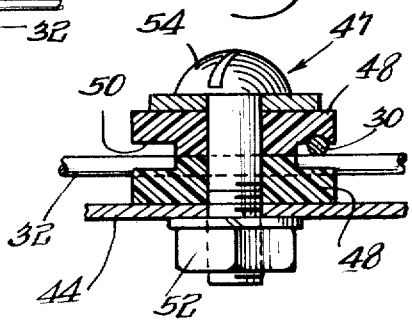
FIG. 6 is a cross sectional view of a vibrator mount taken on line 6—6 of FIG. 5.

Vibrator 22 is attached to the aforementioned coil connecting means by a vibrator attachment means 47, as may be seen in FIGS. 4, 5 and 6. The vibrator attachment means comprises a split mount which includes a pair of mounting buttons 48. The lateral and longitudinal connecting wires are placed in a wire groove 50 which is formed by buttons 48, and the mounting buttons are held together by a nut and bolt 52 and 54, respectively. The bolt 54 extends through a bolt hole in vibrator plate 44 to attach the vibrator to the connecting means, thus attaching the vibrator to the above mentioned wires.

As may be seen in FIG. 4, the attachment means fixes the vibrator 20 to the coil connecting means at the intersections of a plurality of longitudinal and lateral connecting wires and in substantially the same plane at the coil connecting means. The vibrator is positioned in the central portion of the spring assembly so that the vibrator is proximate the location of the center of gravity of a person supported by the spring structure.

As was pointed out above, box spring 14 is used in the bed in conjunction with mattress 12. The mattress is supported by the box springs and is adapted to receive a person thereon. The electric motor is energized from a suitable electric source through a connecting cord 56. When the electric motor 38 is energized, its shaft rotates and the unbalanced weight tends to throw the shaft's rotation off center, so that the motor moves in a substantially rotary path during its rotation. However, the weight of a person on the bed tends to flatten out the substantially rotary path of the motor and deforms the path to an elliptical path, which path has a very small vertical component. Inasmuch as the shaft has its axis of rotation positioned substantially parallel to the longitudinal connecting wires 32, the vibrator sets up a vibratory force in a direction which is lateral to the spring structure. However, the longitudinal and lateral connecting wires are interconnected by links 34, and the upper portion of the coils, so that the entire structure of the connecting wires and links vibrates to vibrate the entire mattress 12 substantially uniformly over the entire surface of mattress 12.

Although the upper coils of the coil springs 20 vibrate with the coil connecting means, the vibratory energy of the vibrator is substantially absorbed by the coil springs 20 before it is transmitted to the spring frame 16. Thus, there is no objectionable vibration of the bed which makes noise and has a tendency to shake the component parts of the bed loose from each other. Furthermore, it may be seen that the overall surface of the mattress is put into vibration without localization of the vibratory energy. Thus, the vibrator, which provides a vibratory energy source, has its vibratory energy well distributed throughout the entire horizontal plane which engages the mattress 12. It is apparent that the vibratory energy is confined to the plane above the coil springs 20 and to the mattress 12 since the vibratory energy which is transmitted through the coil springs 20 is absorbed thereby so that there is substantially no vibration in the plane of the spring frame.

Although one specific embodiment of the instant invention is shown herein it is apparent that modifications and variations may be made without departing from the spirit and scope of the invention. The scope of the present invention is to be limited only by the following claims.

The invention is claimed as follows:

1. A spring structure for use in a bed having a mattress supported thereon, said spring structure including a spring frame, a plurality of coil spring units mounted on said spring frame, a network of wires interconnecting one end of each of said spring units with similar ends of the other spring units, and a vibrator attached to said network adjacent the center thereof and substantially coplanarly therewith for vibrating said network and transmitting the vibratory energy to said mattress.

2. A spring structure for use in a bed having a mattress supported thereon and comprising: a spring frame, a plurality of longitudinal and lateral rows of upstanding spaced apart coil spring units mounted on said spring frame, a wire network including a plurality of rows of longitudinally and laterally extending wires with the wires of each row connected to the coils of the spring units in corresponding rows, and a vibrator within the periphery of said wire network and attached to certain of said longitudinally and laterally extending wires in substantially coplanar relationship with the top ends of adjacent spring units for vibrating the network of wires and transmitting the vibratory energy to the juxtaposed mattress.

3. A spring structure as claimed in claim 2, wherein adjacent pairs of longitudinally and laterally extending network wires are interconnected with the corresponding spring units by longitudinally and laterally extending links.

4. A spring structure as claimed in claim 2, wherein the vibrator is mounted between two pairs of spring units with a pair of longitudinally extending wires and a pair of laterally extending wires traversing the space between the said two pairs of spring units and supporting the vibrator therebetween.

5. A spring structure as claimed in claim 2, wherein the longitudinal rows of spring units are connected by a pair of longitudinally extending wires and the lateral rows of spring units are connected by a pair of laterally extending wires with adjacent spring units in the longitudinal and lateral rows being interconnected by links attached to adjacent network wires.

*6. A vibrator for attachment to the wires of coil spring constructions of furniture and the like comprising a plate; an electric motor mounted on said plate with an output shaft; an eccentric weight mounted on said output shaft for rotation therewith; and a plurality of attaching means, each attaching means having a slot with normally fixed opening space substantially equal to the thickness of the wire of said spring construction to be engaged thereby, the attaching means being radially located relative to the center of said plate on a locus slightly greater than the distance between portions of wires to be engaged by said slots and the center of said plate when held in operating position by said wires, so that said attaching means can be slipped over said wires which will spring into place in said slots and thereby hold said vibrator in operating position.*

*7. A vibrator for attachment to the wires of coil spring constructions of furniture and the like comprising a plate; an electric motor mounted on said plate with an output shaft; an eccentric weight mounted on said output shaft for rotation therewith; and a plurality of attaching means, each attaching means comprising a pair of washer means mounted on a holding member on said plate to provide a slot with a normally fixed opening space and adapted to clamp between them a wire having the diameter of the wire forming said spring construction to be engaged thereby, the attaching means being radially located relative to the center of said plate on a locus slightly greater than the distance between portions of wires to be engaged by said slots and the center of said plate when held in operating position by said wires, so that said attaching means can be slipped over said wires which will spring into place in said slots and thereby hold said vibrator in operating position.*

*8. A vibrator for attachment to the wires of coil spring constructions of furniture and the like comprising a plate; an electric motor mounted on said plate with an output shaft; an eccentric weight mounted on said output shaft for rotation therewith; and a plurality of attaching means, each attaching means comprising a pair of insulating washer means mounted on a holding member on said*

*plate to provide a slot with a fixed opening space and adapted to clamp between them a wire having the diameter of the wire forming said spring construction to be engaged thereby, the attaching means being radially located relative to the center of said plate on a locus slightly greater than the distance between portions of wires to be engaged by said slots and the center of said plate when held in operating position by said wires, so that said attaching means can be slipped over said wires which will spring into place in said slots and thereby hold said vibrator in operating position.*

References Cited

The following references, cited by the Examiner, are of record in the patented file of this patent or the orginal patent.

UNITED STATES PATENTS

| | | |
|---|---|---|
| 2,425,655 | 8/1947 | Tompkins. |
| 2,668,530 | 2/1954 | Tackaberry. |
| 2,852,021 | 9/1958 | Jessup. |

L. W. TRAPP, *Primary Examiner.*
RICHARD A. GAUDET, *Examiner.*